United States Patent
Friedrich et al.

(10) Patent No.: US 10,651,780 B2
(45) Date of Patent: May 12, 2020

(54) METHOD FOR OPERATING A CIRCUIT ASSEMBLY

(71) Applicant: Robert Bosch GmbH, Stuttgart (DE)

(72) Inventors: Stefan Friedrich, Deizisau (DE); Simon Dierolf, Kirchheim/Teck (DE)

(73) Assignee: Robert Bosch GmbH, Stuttgart (DE)

(*) Notice: Subject to any disclaimer, the term of this patent is extended or adjusted under 35 U.S.C. 154(b) by 0 days.

(21) Appl. No.: 15/513,627

(22) PCT Filed: Sep. 2, 2015

(86) PCT No.: PCT/EP2015/070024
§ 371 (c)(1),
(2) Date: Mar. 23, 2017

(87) PCT Pub. No.: WO2016/045920
PCT Pub. Date: Mar. 31, 2016

(65) Prior Publication Data
US 2017/0310271 A1     Oct. 26, 2017

(30) Foreign Application Priority Data

Sep. 24, 2014    (DE) ........................ 10 2014 219 243

(51) Int. Cl.
*H02P 6/28*      (2016.01)
*H02H 1/00*      (2006.01)
(Continued)

(52) U.S. Cl.
CPC .............. *H02P 29/68* (2016.02); *H02P 6/085* (2013.01); *H02P 29/02* (2013.01)

(58) Field of Classification Search
CPC . H02P 6/28; H02P 27/06; H02P 29/68; H02H 7/0383
(Continued)

(56) References Cited

U.S. PATENT DOCUMENTS 5,495,154 A * 2/1996 Carobolante ............. H02P 6/28
                                                     318/293
2004/0189229 A1* 9/2004 Nadd ................... H02H 7/0838
                                                     318/434
(Continued)

FOREIGN PATENT DOCUMENTS

CN         104024038        9/2014
DE     102011086079 A1      5/2013
(Continued)

OTHER PUBLICATIONS

International Search Report dated Jan. 18, 2016, of the corresponding International Application PCT/EP2015/070024 filed Sep. 2, 2015.

*Primary Examiner* — Cortez M Cook
(74) *Attorney, Agent, or Firm* — Norton Rose Fulbright US LLP; Gerard Messina

(57) ABSTRACT

A method for operating a circuit system having at least three control stages for at least three phases, each of the control stages having a high-side switch and a low-side switch, each of the high-side switches and each of the low-side switches being capable of being brought into an electrically conductive state and into an electrically non-conductive state, a quantity being determined that influences the temperature of the high-side switches and/or of the low-side switches, either the high-side switches or the low-side switches being selected in a group as a function of the quantity influencing the temperature, and the selected high-side switches or low-side switches being controlled in a freewheeling phase in such a way that the selected high-side switches or low-side switches form a freewheel during the freewheeling phase.

10 Claims, 4 Drawing Sheets

(51) Int. Cl.
*H02P 27/06* (2006.01)
*H02P 29/68* (2016.01)
*H02P 29/02* (2016.01)
*H02P 6/08* (2016.01)

(58) Field of Classification Search
USPC .................................. 318/293, 434, 400.09
See application file for complete search history.

(56) References Cited

U.S. PATENT DOCUMENTS

| | | | | |
|---|---|---|---|---|
| 2008/0116838 | A1* | 5/2008 | Hattori | ................. B60H 1/3223 |
| | | | | 318/722 |
| 2010/0253257 | A1 | 10/2010 | Clothier et al. | |
| 2012/0049777 | A1* | 3/2012 | Kern | ......................... H02P 6/16 |
| | | | | 318/400.35 |
| 2012/0218800 | A1* | 8/2012 | Jimichi | ............. H02M 7/53803 |
| | | | | 363/131 |
| 2013/0119908 | A1* | 5/2013 | Harada | .................... H02P 6/10 |
| | | | | 318/400.42 |

FOREIGN PATENT DOCUMENTS

| | | |
|---|---|---|
| DE | 102012210658 A1 | 12/2013 |
| JP | 2006174659 A | 6/2006 |
| JP | 2011135713 A | 7/2011 |
| JP | 2012075234 A | 4/2012 |
| JP | 2012217263 A | 11/2012 |

\* cited by examiner

METHOD FOR OPERATING A CIRCUIT ASSEMBLY

FIELD

The present invention relates to a method for operating a circuit system, and to a computing unit and a computer program for carrying out the method.

BACKGROUND INFORMATION

BLDC motors (brushless DC motors) have a particularly simple design. In contrast to conventional electric motors, BLDC motors do not have a mechanical commutator.

A magnetic rotary field for operating the BLDC motor can be produced using an inverter whose semiconductor circuit elements can be controlled in various ways for this purpose. The controlling can take place for example using pulse-width modulation (PWM), in block operation, using space vector modulation, triangle-square modulation, triangle-sine modulation, or flat-top modulation.

German Patent Application No. DE 10 2012 210 658 A1 describes that space vector modulation can be used to provide a magnetic rotary field through a circuit system fashioned as an inverter. For each phase, the inverter has a control stage having a high-side switch and a low-side switch. As a function of the angular position of the rotor, having a permanent magnet, of the BLDC motor, the high-side and low-side switches of the control stages are controlled in alternating fashion in order to set the magnetic rotary field.

The power with which the BLDC motor can be operated is a function of the power loss of the inverter. The power loss causes a heating of the inverter, which limits the maximum power of the BLDC motor.

Therefore, there is a need for increasing the power that can be supplied by such a circuit system.

SUMMARY

According to the present invention, a method for operating a circuit system, as well as a computing unit and a computer program for carrying out the method, are proposed. Advantageous embodiments are described herein.

A circuit system is used having at least three control stages for at least three phases, e.g., for a three-phase BLDC motor. Each of the control stages has a high-side switch and a low-side switch, and each of the high-side switches and low-side switches can be brought into an electrically conductive state and into an electrically non-conductive state. In a first step, a quantity that influences the temperature of the high-side switch and/or of the low-side switch is then determined. In a further step, the high-side switches or the low-side switch are selected in groups as a function of the determined quantity. In a further step, the selected high-side switches or low-side switches are controlled in a freewheeling phase in such a way that the selected high-side switches or low-side switches form a freewheel during the freewheeling phase.

Here, the selection in groups of the high-side switches or of the low-side switches is understood to mean that either all the high-side switches or all the low-side switches are selected, and that all selected switches are supplied with the same control signals. Thus, during the freewheeling phases either only the high-side switches or only the low-side switches are loaded, and thus heated, corresponding to their temperature. As a result, during the freewheeling phases the circuit system heats up more slowly, so that more energy can be supplied to the controlled component, e.g., a BLDC motor. In addition, for a constant power level of the controlled component the circuit system can be dimensioned smaller, which reduces the constructive space requirement and the costs for the circuit system.

According to a specific embodiment, during the freewheeling phase the selected high-side switches or low-side switches, which form the freewheel, are in the conductive state, and the other high-side switches or low-side switches are in the non-conductive state. Thus, during the freewheeling phase only the selected high-side switches or low-side switches are loaded, and thus heated. This makes it possible in particular to cool one group of the switches more strongly, and to preferably use this group for the freewheel. As a result, through an improved dissipation of heat, by, e.g., a cooling element or a larger cooling element, more energy can be supplied to the selected switches of the controlled component, while the other switches do not require such an improved heat dissipation.

According to a further specific embodiment, for the quantity that influences the temperature of the high-side switches and/or of the low-side switches a power loss, a current, a current level, a current duration, and/or a temperature itself is determined. In this way, the heating is acquired immediately. This simplifies the evaluation of the temperature measurement value.

According to a further specific embodiment, in the selection in groups the quantity is compared to a temperature boundary value, and when the temperature boundary value is exceeded the high-side switches or low-side switches are selected that do not exceed the temperature boundary value. In this way, it is ensured in a simple manner that the already-selected high-side switches or low-side switches do not overheat during the freewheeling phases, thus incurring damage.

According to a further specific embodiment, the quantity of the high-side switches and of the low-side switches is determined, and the high-side switches or low-side switches having the lower quantity are selected. By determining the quantity distribution, different thermal load boundaries and/or differently good cooling connections of the high-side switches or low-side switches can be taken into account in the selection. Thus, the individual load boundaries of the high-side switches and low-side switches can be optimally used to maximize the maximum power level of the controlled component.

According to a further specific embodiment, a semiconductor module, in particular an IC, is used on which the high-side switches and the low-side switches are situated, the high-side switches being situated in a center segment of the semiconductor module and the low-side switches being situated in an edge segment of the semiconductor module. Due to this configuration on the semiconductor module, the high-side switches have a better cooling connection to the semiconductor module than do the low-side switches. Here, the semiconductor module can be installed on a semiconductor substrate with the high-side switches and the low-side switches, or the semiconductor module has a bearer on which a plurality of semiconductors are mounted that form the high-side switches and the low-side switches. Through the present invention, the heat dissipation in such a bridge-IC can be optimized. A bridge IC often has a p-channel transistor as high-side switch and an n-channel transistor as low-side switch. The p-channel transistor requires a larger surface than does the n-channel transistor for the same power properties. In addition, as a rule the high-side switches are placed centrally in the IC, and the low-side switches are placed on the edge. Due to the larger surface and central positioning, heat can be better dissipated away from the high-side switches. As a result, the bridge is limited by the poorer cooling connection of the low-side switches, even though the high-side switches can still handle additional power.

The present invention is particularly suitable for use in vehicles, because there rough environmental conditions prevail, with cooling properties critical at some locations. Preferred applications are for example the controlling of electrical machines in start-step systems, electrical turbochargers and starters, steering systems and gear mechanisms, as well as air-conditioning compressors and ventilators.

A computing unit according to the present invention, e.g. a control device of a motor vehicle, is set up, in particular in terms of programming, to carry out a method according to the present invention.

The implementation of the method in the form of software is also advantageous because this results in particularly low costs, in particular if an executing control device is also used for further tasks and is therefore already present anyway. Suitable data carriers for providing the computer program are in particular diskettes, hard drives, flash memories, EEPROMs, CD-ROMs, DVDs, and others. It is also possible to download a program over computer networks (Internet, intranet, etc.).

Further advantages and embodiments of the present invention result from the description and the accompanying drawing.

It will be understood that the features named above and explained below may be used not only in the respectively indicated combination, but also in other combinations, or by themselves, without departing from the scope of the present invention.

The present invention is shown schematically in the figures on the basis of an exemplary embodiment, and is described in detail below with reference to the figures.

DETAILED DESCRIPTION OF EXAMPLE EMBODIMENTS

Figure 1:
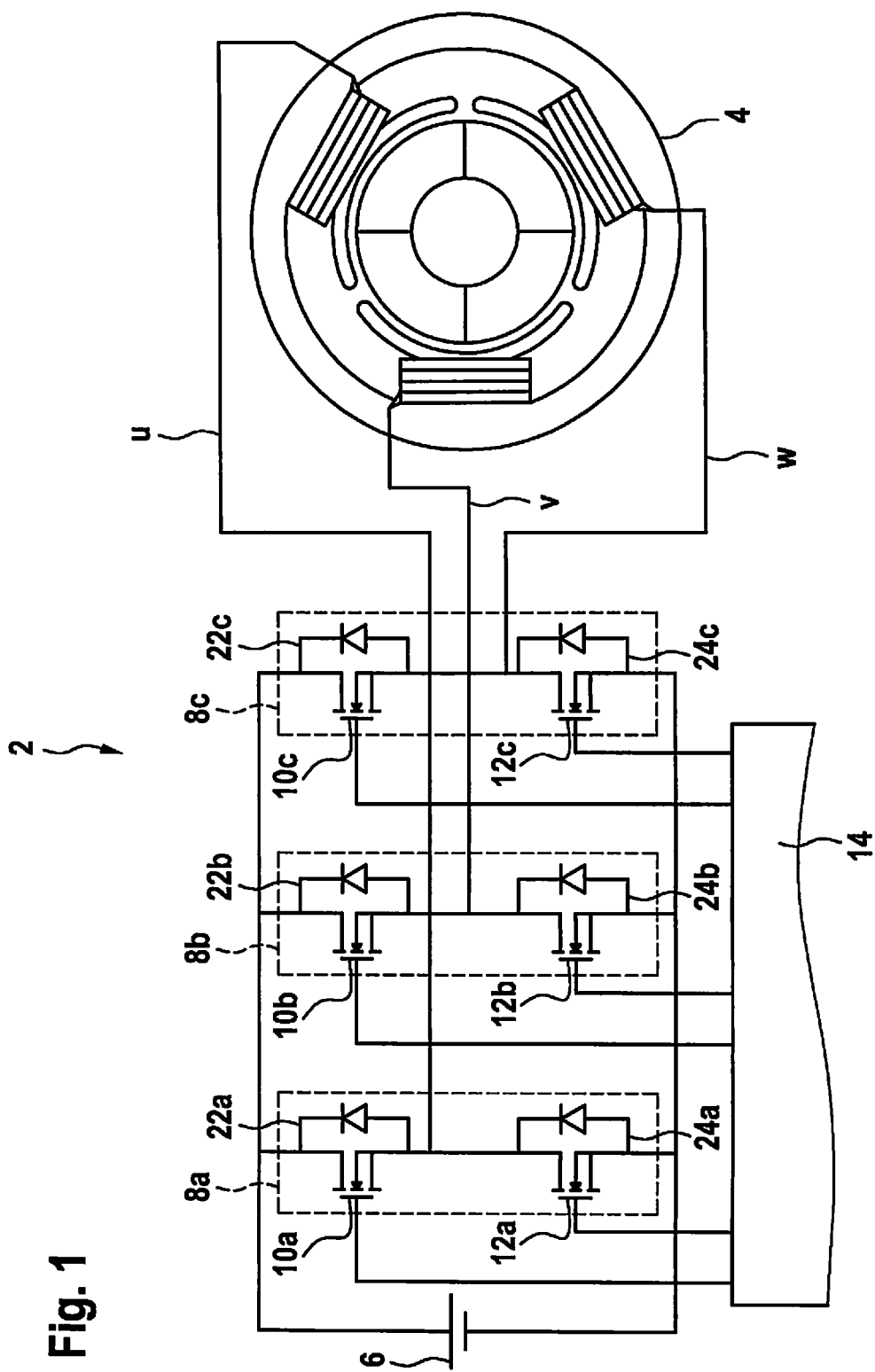
FIG. 1 shows a circuit system for controlling a three-phase BLDC motor having three phases.

FIG. 1 shows a circuit system 2 for controlling a BLDC motor 4 as controlled component, the circuit system 2 being fed by an electrical direct voltage source 6.

In the present exemplary embodiment, BLDC motor 4 has a rotor having one or more permanent magnets and a stator having three stator windings assigned to the three phases u, v, w. For charging each of the stator windings, circuit system 2 has a respective, i.e., a total of three, control stages 8a, 8b, 8c.

Thus, in the present exemplary embodiment circuit system 2 is fashioned as a B6 bridge inverter. Preferred applications of a B6 bridge inverter for controlling a BLDC motor 4 in a motor vehicle are e.g. start-stop systems, electrical turbochargers and starters, steering systems and gear mechanisms, as well as air-conditioning compressors and ventilators.

Each of the three control stages 8a, 8b, 8c has a respective high-side switch 10a, 10b, 10c and a low-side switch 12a, 12b, 12c. In addition, a respective freewheel 22a, 22b, 22c, 24a, 24b, 24c is assigned to each high-side switch 10a, 10b, 10c and low-side switch 12a, 12b, 12c. In the present exemplary embodiment, high-side switches 10a, 10b, 10c are p-channel semiconductor switching elements, such as p-channel transistors, and low-side switches 12a, 12b, 12c are n-channel semiconductor switching elements, such as n-channel transistors. Instead of transistors, p- or n-channel power MOSFETs or thyristors, such as GTOs, can also be used.

Via control lines, each of the high-side switches 10a, 10b, 10c and each of the low-side switches 12a, 12b, 12c is connected to a control device 14 of circuit system 2 in order to bring high-side switches 10a, 10b, 10c and low-side switches 12a, 12b, 12c into an electrically conductive state and into an electrically non-conductive state. For this purpose—as explained further below—control device 14 produces pulse-width-modulated control signals that cause a change from the electrically conductive state to the non-conductive state, and vice versa, of high-side switches 10a, 10b, 10c and low-side switches 12a, 12b, 12c. Control device 14 can be part of a computing unit, e.g. a control device of a motor vehicle. Control device 14 can include hardware and/or software components.

Figure 2:
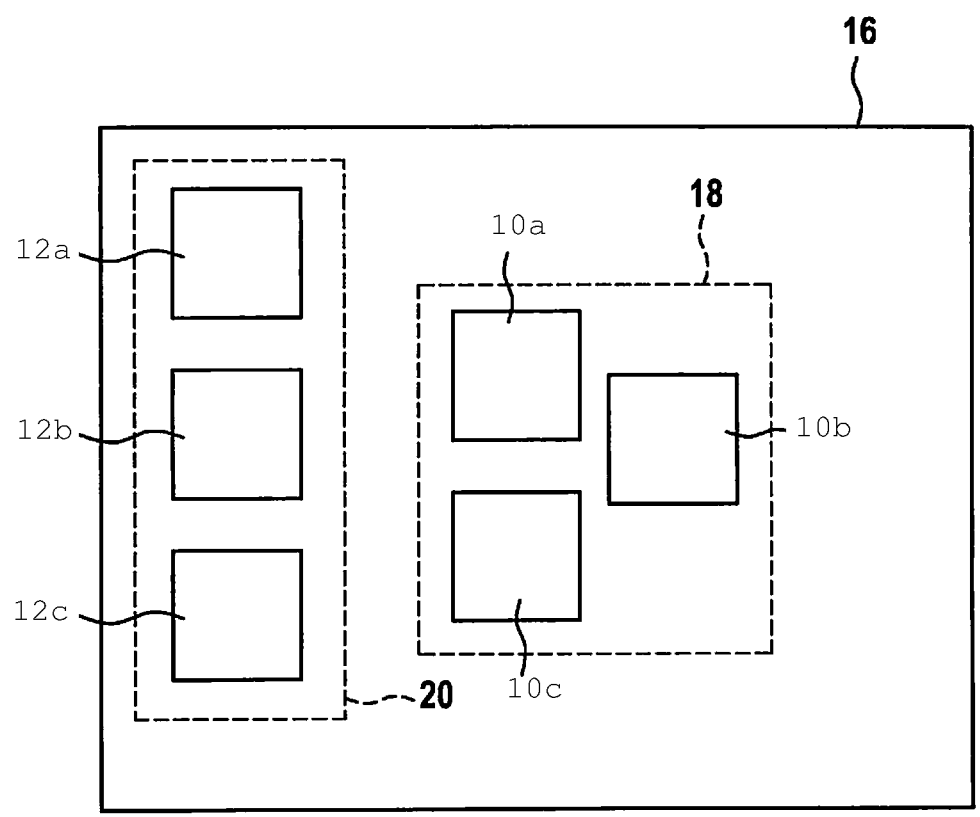
FIG. 2 shows the configuration of high-side switches and low-side switches on a semiconductor module for controlling the three-phase BLDC motor.

FIG. 2 shows a preferred configuration of high-side switches 10a, 10b, 10c and low-side switches 12a, 12b, 12c on a semiconductor module 16 (integrated circuit, IC) of circuit system 2.

Semiconductor module 16 can be built on a semiconductor substrate with high-side switches 10a, 10b, 10c and low-side switches 12a, 12b, 12c, or semiconductor module 16 has a bearer on which a plurality of semiconductors are mounted that form high-side switches 10a, 10b, 10c and low-side switches 12a, 12b, 12c.

On the basis of FIG. 2, it will be seen that high-side switches 10a, 10b, 10c are situated in a center segment 18 of semiconductor module 16, and low-side switches 12a, 12b, 12c are situated in an edge segment 20 of semiconductor module 16. Due to this configuration on semiconductor module 16, high-side switches 10a, 10b, 10c have a better cooling connection to semiconductor module 16 than do low-side switches 12a, 12b, 12c.

In addition, high-side switches 10a, 10b, 10c, formed as p-channel semiconductor switching elements, have a larger surface than do low-side switches 12a, 12b, 12c, formed as n-channel semiconductor switching elements. In this way, the heat dissipation of high-side switches 10a, 10b, 10c is further improved.

Figure 3:
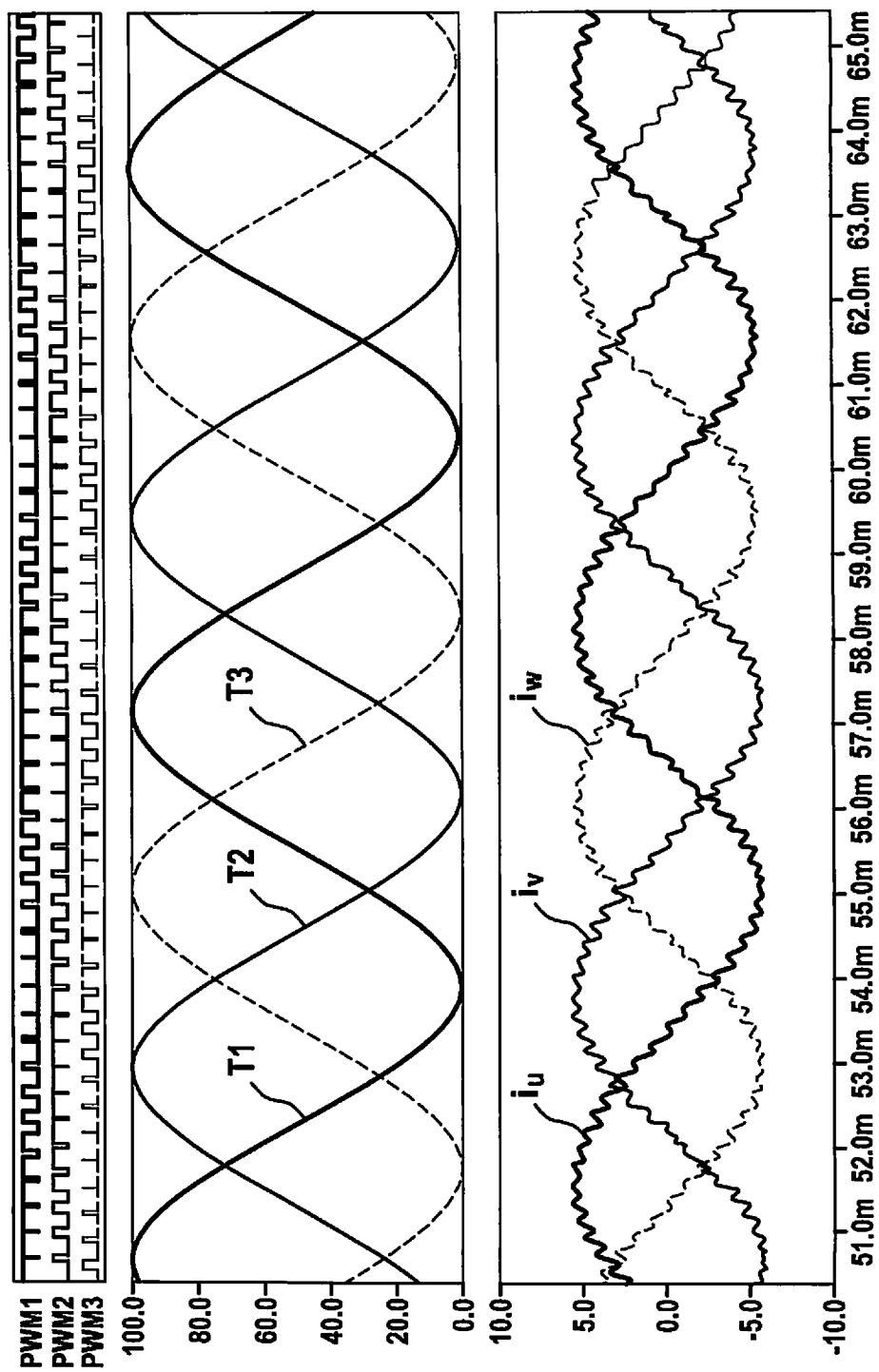
FIG. 3 shows a temporal curve of the control signals, the pulse-duty factors, and the electrical currents of the three phases according to a conventional triangle-sine modulation.
Figure 4:
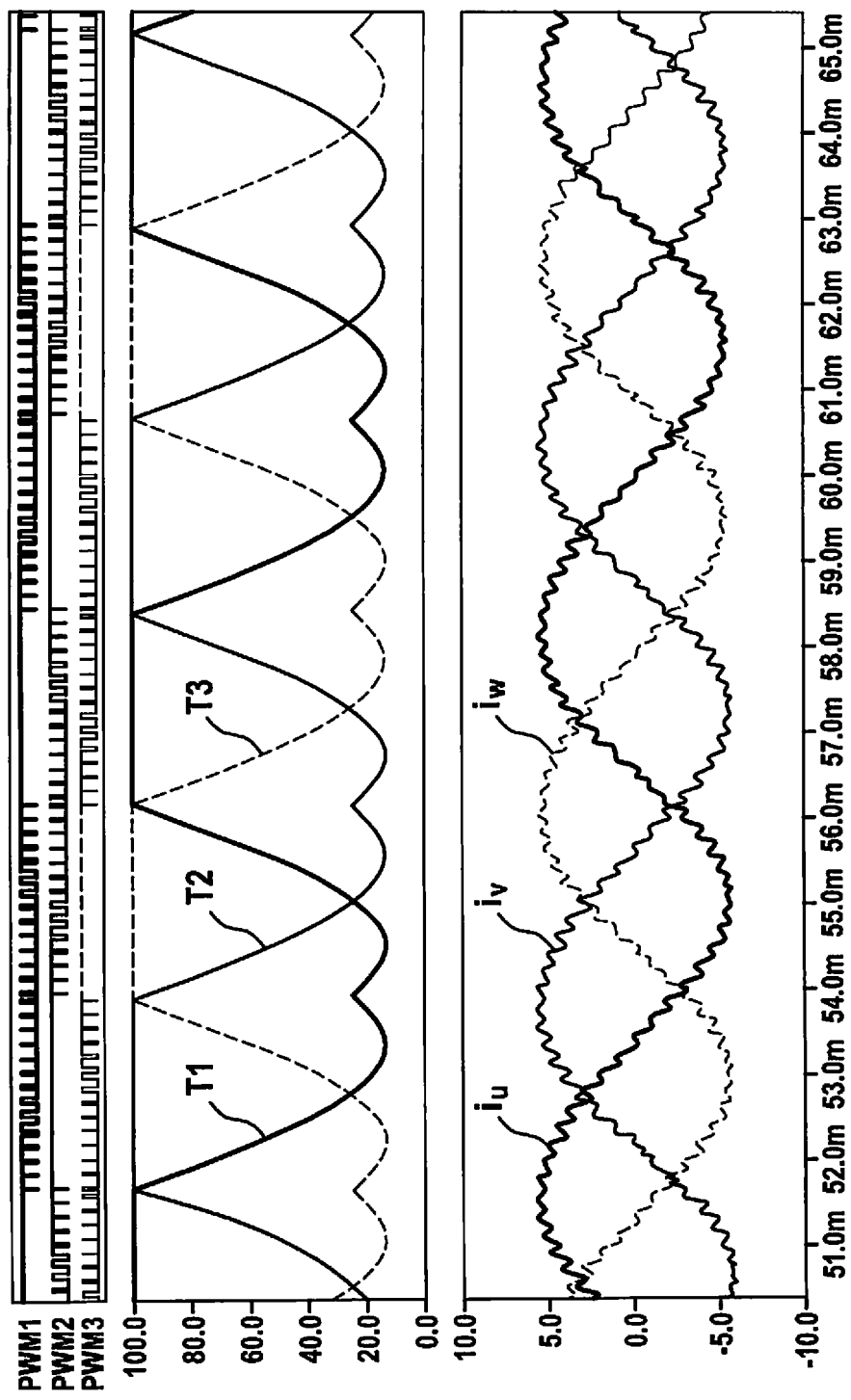
FIG. 4 shows a temporal curve of the control signals, the pulse-duty factors, and the electrical currents of the three phases according to a preferred specific embodiment of the present invention.

The method for operating a circuit system 2 is now explained with additional reference to FIGS. 3 and 4. In FIGS. 3 and 4, at the top three pulse-width-modulated control signals PWM1, PWM2, PWM3 are shown for each of the control stages 8a, 8b, 8c, and under them the associated pulse-duty factors T1, T2, T3 are shown, and under these the currents $i_u$, $i_v$, $i_w$ flowing in the three phases u, v, w are shown.

During operation, control device 14 produces pulse-width-modulated control signals PWM1, PWM2, PWM3 for each of the control stages 8a, 8b, 8c, so that in BLDC motor 4 the electrical phase currents $i_u$, $i_v$, $i_w$ form a rotary magnetic field having the desired frequency for driving the rotor. For example, the controlling takes place according to a triangle-sine modulation (FIG. 3). In principle, the controlling can take place according to an arbitrary control schema (e.g. space vector, triangle-carrier wave, etc.), as long as the following three control phases can be identified therein:

Phase 1: all control stages 8a, 8b, 8c have active low-side switches (freewheel)

Phase 2: not all control stages 8a, 8b, 8c have the same switch position

Phase 3: all control stages 8a, 8b, 8c have active high-side switches (freewheel)

In phase 1 and phase 3, no new energy is fed into the motor. The energy in the motor is dismantled through a freewheel over all switches. The two phases are functionally identical, so that one of the two phases can be omitted. The omitted phase is replaced by the other phase. Here it is important that phase 2 (different switch position) remains unchanged in its temporal sequence.

The replacement of phase 1 by phase 3 and vice versa in FIG. 4 results in a switching schema according to FIG. 4 that has flat-top portions. For this purpose, in a first step the temperature and/or power loss of high-side switches 10a, 10b, 10c and/or low-side switches 12a, 12b, 12c is determined as the quantity influencing the temperature of the high-side switches and/or low-side switches. For this purpose, e.g., the temperature of high-side switches 10a, 10b, 10c and/or low-side switches 12a, 12b, 12c can be measured and evaluated. Alternatively, an electrical quantity of high-side switches 10a, 10b, 10c and/or low-side switches 12a, 12b, 12c can be measured and evaluated. The electrical quantity can be an electrical current flowing through high-side switches 10a, 10b, 10c and/or low-side switches 12a, 12b, 12c, an electrical voltage present at high-side switches 10a, 10b, 10c and/or low-side switches 12a, 12b, 12c, or can be a time duration for which the high-side switches and/or low-side switches are in the electrically conductive state. The time duration can be determined for example by evaluating a pulse-duty factor of control signals PWM1, PWM2, PWM3.

In a second step, high-side switches 10a, 10b, 10c or low-side switches 12a, 12b, 12c are selected in groups. For the selection in groups of high-side switches 10a, 10b, 10c or low-side switches 12a, 12b, 12c, the determined temperature is compared to a temperature boundary value. When the boundary value is exceeded, the high-side switches 10a, 10b, 10c or low-side switches 12a, 12b, 12c that do not exceed the boundary value are selected. Alternatively or in addition, it can be provided to select the high-side switches 10a, 10b, 10c or low-side switches 12a, 12b, 12c having the lower temperature. In the present exemplary embodiment, the high-side switches 10a, 10b, 10c are selected as a group and, as is further explained below, are supplied with the same control signals.

In a further step, during the freewheeling phase the high-side switches 10a, 10b, 10c and low-side switches 12a, 12b, 12c are controlled by control device 14 through the provision of pulse-width-modulated control signals PWM1, PWM2, PWM3 in such a way that for example all high-side switches 10a, 10b, 10c are in the conductive state and all low-side switches 12a, 12b, 12c are in the non-conductive state, and all high-side switches 10a, 10b, 10c thus form a freewheel in order to dismantle the electrical and/or magnetic energies stored in the stator windings.

In a further step, during the power supply phase high-side switches 10a, 10b, 10c and low-side switches 12a, 12b, 12c are controlled by control device 14 by providing pulse-width-modulated control signals PWM1, PWM2, PWM3 in such a way that not all high-side switches 10a, 10b, 10c, or not all low-side switches 12a, 12b, 12c, have the same states.

In a further step, during the following freewheeling phase between two power supply phases, high-side switches 10a, 10b, 10c and low-side switches 12a, 12b, 12c are controlled by control device 14 through the provision of the pulse-width-modulated control signals PWM1, PWM2, PWM3 in such a way that for example all high-side switches 10a, 10b, 10c are again in the conductive state and all low-side switches 12a, 12b, 12c are in the non-conductive state, and so that again all high-side switches 10a, 10b, 10c form the freewheel.

Thus, during the freewheeling phases only the high-side switches 10a, 10b, 10c, which have a better cooling connection compared to low-side switches 12a, 12b, 12c, are loaded and thus heated. As a result, circuit system 2 heats up more slowly during the freewheeling phases due to the described operation, so that more energy can be supplied to BLDC motor 4. In addition, for a constant motor power level of BLDC motor 4, circuit system 2 can be dimensioned smaller, which reduces the constructive space requirement and costs for circuit system 2.

If high-side switches 10a, 10b, 10c have heated up too strongly due to the loading, and this has been ascertained by determining the temperature of high-side switches 10a, 10b, 10c and/or low-side switches 12a, 12b, 12c, control device 14 can now control low-side switches 12a, 12b, 12c to a further freewheeling phase by providing pulse-width-modulated control signals PWM1, PWM2, PWM3, in such a way that low-side switches 12a, 12b, 12c are now in the conductive state during the further freewheeling phases.

There thus takes place a change of load from high-side switches 10a, 10b, 10c to low-side switches 12a, 12b, 12c during this further freewheeling phase.

As a result, circuit system 2 heats up still more slowly due to the described operation having these freewheeling phases, so that still more energy can be supplied to BLDC motor 4, or, with motor power of BLDC motor 4 remaining constant, circuit system 2 can be dimensioned still smaller.

What is claimed is:

1. A method for operating a circuit system having at least three control stages for at least three phases, each of the control stages having a high-side switch and a low-side switch, each of the high-side switches and each of the low-side switches being capable of being brought into an electrically conductive state and into an electrically non-conductive state, the method comprising:

determining a quantity that influences a temperature of at least one of the high-side switches and the low-side switches;

selecting, in groups, either the high-side switches or the low-side switches as a function of the quantity influencing the temperature; and controlling the selected high-side switches or low-side switches in a freewheeling phase, so that the selected high-side switches or low-side switches form a freewheel during the freewheeling phase;

wherein the high-side switches are situated and mounted in a center segment of a semiconductor module, and the low-side switches are situated and mounted in an edge segment of the semiconductor module, so that the high-side switches have a better cooling connection to the semiconductor module than the low-side switches, wherein the edge segment and the center segment are separate from one another on the semiconductor module, wherein the center segment has a larger surface area than does the edge segment, and wherein the semiconductor module is an integrated circuit, wherein the semiconductor module is on a semiconductor substrate, and wherein the high-side switches are formed as p-channel semiconductor switching elements having a larger surface than the low-side switches, which are formed as n-channel semiconductor switching elements, so as to improve heat dissipation of the high-side switches.

2. The method as recited in claim 1, wherein during the freewheeling phase, the selected high-side switches or low-side switches that form the freewheel are in a conductive state, and the other of the high-side switches or low-side switches are in a non-conductive state.

3. The method as recited in claim 1, wherein at least one of: a power loss, a current, and a temperature of at least one of the high-side switches and the low-side switches is determined as the quantity influencing the temperature.

4. The method as recited in claim 1, wherein during the selecting in groups, the quantity influencing the temperature is compared to a temperature boundary value, and when there is an exceeding of the temperature boundary value, the high-side switches or low-side switches are selected that do not exceed the temperature boundary value.

5. The method as recited in claim 1, wherein the temperature-influencing quantity of the high-side switches and of the low-side switches is determined, and the high-side switches or low-side switches having the lower temperature-influencing quantity are selected.

6. A computing unit for operating a circuit system having at least three control stages for at least three phases, each of the control stages having a high-side switch and a low-side switch, each of the high-side switches and each of the low-side switches being capable of being brought into an electrically conductive state and into an electrically non-conductive state, comprising:
  a computing device configured to perform the following:
    determine a quantity that influences a temperature of at least one of the high-side switches and the low-side switches;
    select, in groups, either the high-side switches or the low-side switches as a function of the quantity influencing the temperature; and
    control the selected high-side switches or low-side switches in a freewheeling phase, so that the selected high-side switches or low-side switches form a freewheel during the freewheeling phase;
  wherein the high-side switches are situated and mounted in a center segment of a semiconductor module, and the low-side switches are situated and mounted in an edge segment of the semiconductor module, so that the high-side switches have a better cooling connection to the semiconductor module than the low-side switches,
  wherein the edge segment and the center segment are separate from one another on the semiconductor module,
  wherein the center segment has a larger surface area than does the edge segment, and wherein the semiconductor module is an integrated circuit,
  wherein the semiconductor module is on a semiconductor substrate, and
  wherein the high-side switches are formed as p-channel semiconductor switching elements having a larger surface than the low-side switches, which are formed as n-channel semiconductor switching elements, so as to improve heat dissipation of the high-side switches.

7. A non-transitory computer readable storage medium having a computer program, which is executable by a computing unit, comprising:
  a computer program for operating a circuit system having at least three control stages for at least three phases, each of the control stages having a high-side switch and a low-side switch, each of the high-side switches and each of the low-side switches being capable of being brought into an electrically conductive state and into an electrically non-conductive state, by performing the following:
    determining a quantity that influences a temperature of at least one of the high-side switches and the low-side switches;
    selecting, in groups, either the high-side switches or the low-side switches as a function of the quantity influencing the temperature; and
    controlling the selected high-side switches or low-side switches in a freewheeling phase, so that the selected high-side switches or low-side switches form a freewheel during the freewheeling phase;
  wherein the high-side switches are situated and mounted in a center segment of a semiconductor module, and the low-side switches are situated and mounted in an edge segment of the semiconductor module, so that the high-side switches have a better cooling connection to the semiconductor module than the low-side switches,
  wherein the edge segment and the center segment are separate from one another on the semiconductor module,
  wherein the center segment has a larger surface area than does the edge segment, and wherein the semiconductor module is an integrated circuit,
  wherein the semiconductor module is on a semiconductor substrate, and
  wherein the high-side switches are formed as p-channel semiconductor switching elements having a larger surface than the low-side switches, which are formed as n-channel semiconductor switching elements, so as to improve heat dissipation of the high-side switches.

8. The non-transitory computer readable storage medium as recited in claim 7, wherein the quantity that influences the temperature of the high-side switches and/or of the low-side switches includes at least one of a power loss, a current, a current level, a current duration, and a temperature.

9. The method as recited in claim 1, wherein the quantity that influences the temperature of the high-side switches and/or of the low-side switches includes at least one of a power loss, a current, a current level, a current duration, and a temperature.

10. The computing unit as recited in claim 6, wherein the quantity that influences the temperature of the high-side switches and/or of the low-side switches includes at least one of a power loss, a current, a current level, a current duration, and a temperature.

* * * * *